3,414,116
CONVEYOR SCRAPER MEANS
Robert F. Oury, Wayne, Ill., assignor, by mesne assignments, to Harsco Corporation, Wormleysburg, Pa., a corporation of Delaware
Filed Aug. 5, 1966, Ser. No. 570,450
11 Claims. (Cl. 198—230)

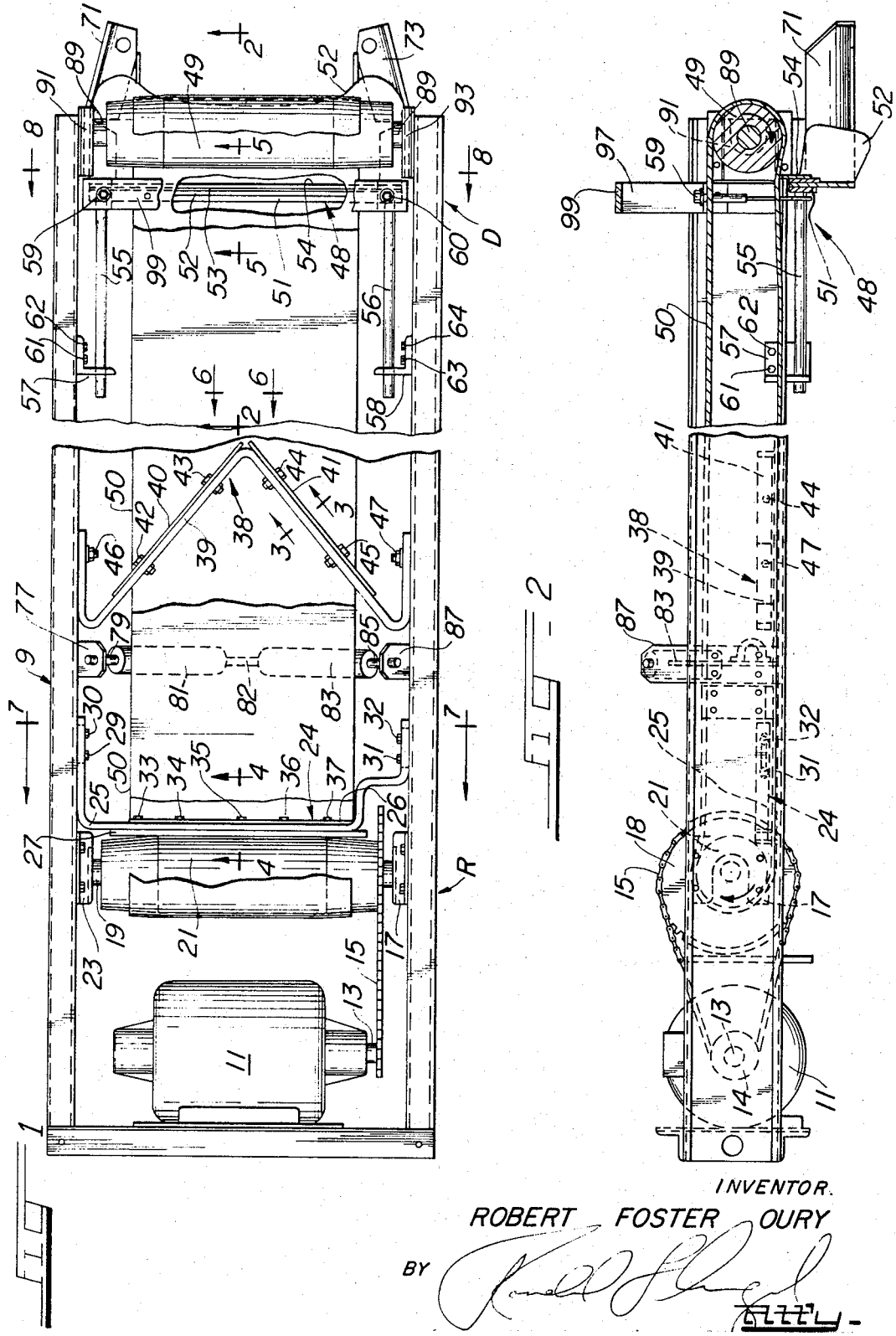

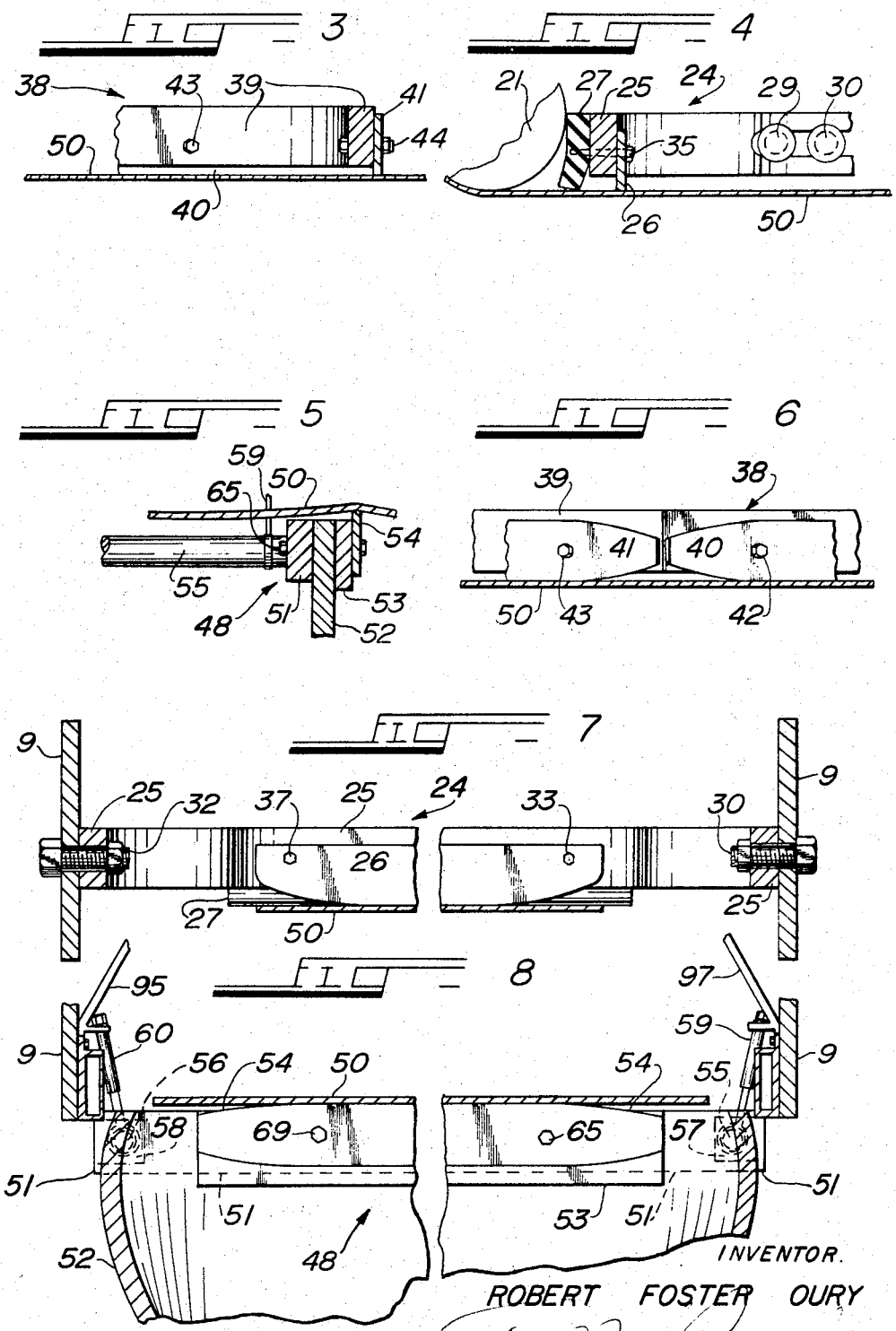

ABSTRACT OF THE DISCLOSURE

In a horizontal conveyor having a belt with an outer surface and an inner surface arranged between a receiving pulley and a discharge pulley to form a closed loop having a top side and a bottom side, the belt can be efficiently cleaned by providing, in the manner described hereinafter in detail, a discharge end scraper positioned in contact with the outer surface of the belt and located on the bottom side of the loop; a receiving end scraper positioned in contact with the inner surface of the belt and the surface of the receiving pulley; and skimming means positioned in contact with the inner surface of the belt and located on the bottom side of the loop between the receiving end scraper and discharge pulley.

---

This invention relates generally to belt conveyor cleaning techniques and more specifically to scraper means designed to remove foreign material from the belts of conveyors. Horizontal belt conveyors are often used to transport bulk materials such as coal, gravel, crushed rock, and wet cement over relatively short distances to eliminate the necessity for hand loading and carriage, and to increase the speed and convenience of handling such materials in large quantity.

To accomplish this goal the conveyors generally employ a closed belt which is placed around two pulleys to form a loop. One of the pulleys (hereinafter called "receiving pulley") is placed at the end of the conveyor which receives the materials to be transported, and the other pulley (hereinafter called "discharge pulley") is placed at the end of the conveyor which discharges the material. Additional rollers are used along the length of the belt to give added support. A motor is attached to one of the pulleys to drive the belt at an appropriate speed.

To operate the conveyor, material is deposited on the top surface of the belt loop at the receiving end and is carried to the discharge end where the conveyed material falls from the belt as the belt passes around the discharge pulley. The belt then travels along the bottom side of its loop, passes around the receiving pulley to the top side of its loop, and receives another load of material. Since the belt is arranged to form a closed loop, material is constantly being received and discharged from the conveyor during operation.

Conveyors of the type described above also commonly employ one or more scraper means for the purpose of cleaning the surface of the belt at appropriate points in the operating cycle. However, previously known scraping techniques have not been entirely satisfactory, especially in instances where the conveyed material (such as wet cement) may have a tendency to adhere to the belt surface. In fact, as a practical matter, proper scraping is one of the primary factors affecting the operational characteristics and life of such conveyor belts, and indeed the failure to effect proper scraping can often result in a total shut-down of a conveyor belt system during use.

With the above-described mode of operation in mind, it will be appreciated that for the transportation of certain kinds of materials it is important for the belt speed to remain relatively constant. For example, when the conveyor is used in transporting and pouring wet cement, if the speed is too fast, the cement has a tendency to splash and to be uncontrollable when discharged. If the belt speed is too slow, the pouring operation requires more time than is actually necessary, and indeed the cement agglomeration may tend to separate into its component parts and thereby destroy the efficacy of the entire operation.

In order to keep the belt speed constant, the total load on the drive motor must remain constant. Of course if an increased volume of material or a denser material is carried by the conveyor, the load on the motor will increase and the belt speed will decrease. However, even if the material is held to a constant volume and density, situations still arise in which the load may change and inefficient operation may result. For example, when a wet or sticky substance such as wet cement is transported, the cement has a tendency to adhere to the belt. Consequently, after most of the cement has been discharged, a residue remains on the belt which is carried back to the receiving pulley. After a short time the residue which sticks to the belt can build up into a sizable layer of partially hardened cement which puts an increased strain on the motor, reduces the speed of the belt, and reduces the carrying capacity of the conveyor. In order to prevent such a build-up of a layer of material on the belt, scraper means are conventionally provided adjacent the outside surface of the belt at a point beyond the point of actual discharge (e.g., adjacent the initial bottom portion of the belt loop which is in contact with the discharge pulley). Scraping effected thereby is designed to remove foreign residue immediately after the transported material has been discharged and before the residue has an opportunity to harden or become fixed to the belt.

Although many examples of previous attempts to provide effective scraping of the outside of conveyor belts are shown in the prior art (see, for example, U.S. Patents Nos. 3,141,732, 3,171,534, and 3,203,538), the preferred embodiment of the present invention described herein provides a new and unique approach for scraping the outside of such conveyor belts by the utilization of simple and inexpensive adjustable scraper means that materially enhance the wear characteristics and thus the effective operational life of the conveyor belts scraped thereby.

Consequently, it is a primary object of the present invention to provide improved scraper means for removing foreign material and residue such as accumulated cement from the outside of conveyor belts.

It is a related object of the present invention to provide improved adjustable scraper means to achieve maximum scraping effectiveness and belt life.

From the above discussions it is apparent that build up of foreign residue must be prevented on the outside of a conveyor belt. However, it is equally important to prevent foreign material from collecting on the inside of the belt (as may occur because of splashing, stray particle overflow, etc.). As indicated above, after the transported material has been discharged, the belt returns to the receiving end of the conveyor by traveling underneath the top (transporting portion) of the belt loop. At the receiving end the belt travels around a receiving pulley to the top of the loop where more material is received. If foreign matter such as rock or pieces of cement are located on the inside surface of the belt as it passes around the receiving pulley, the material may become wedged between the belt and the pulley and may cause damage or rough operation. Thus, in addition to the same considerations that require a cleaned exterior belt surface, proper scraping of the interior belt surface is an extremely significant factor in conveyor belt operations. For example, if a rock of sufficient size becomes wedged between the belt and the pulley, the entire mechanism may be jammed, and the belt may break or the entire mechanism may cease to function. If wet cement passes between the belt and pulley, it may cake on the pulley and cause increased tension on the belt which decreases efficiency and results in rough operation. Moreover, if foreign material becomes wedged between the pulley and belt, the conveyor must normally be completely shutdown before the conveyor can be restored to operating condition. Obviously, this involves inordinant expense and delay.

Although many examples of previous attempts at cleaning the inside surface of conveyor belts by scraper means are shown in the prior art (see, for example, the above-cited U.S. Patents Nos. 3,203,538 and 3,171,534), the preferred embodiment of the present invention described herein provides a new and unique approach for scraping the inside of such conveyor belts by the utilization of simple and inexpensive adjustable scraper means, including the sequential action of a skimmer and a scraper, the skimmer being provided with a unique equal pressure pivotable belt contact arrangement and the scraper being provided with an improved leveling feature to prevent undesired movement of the scraper means away from the scraped surfaces.

Accordingly, it is also a primary object of the present invention to provide an improved means for cleaning the inside surface of a conveyor belt to prevent foreign material from traveling between the belt and a pulley about which the belt is driven.

It is a related object of the present invention to provide adjustable scraping means which sequentially skims across the entire width of a conveyor belt while applying uniform pressure to effect efficient cleaning action of the interior surface of the belt and then simultaneously wipes and scrapes both the interior surface of the conveyor belt and the surface of the pulley without any deleterious slipping that would require frequent adjustment.

To achieve the above-mentioned objects, the present invention in its preferred embodiments basically comprises three scrapers, namely, an exterior scraper placed near the discharge pulley and two interior scrapers placed near the receiving pulley, one of the two interior scrapers being positioned between the other interior scraper and the exterior scraper to serve as a skimmer in advance of the scraping of the interior surface of the belt.

The preferred form of the exterior scraper near the discharge end (hereinafter called "discharge end scraper") comprises a hard steel scraper blade which extends across the conveyor belt at a right angle to the belt such that a rectangular or blunt edge of the blade bears uniformly against the belt surface except for marginal areas adjacent the opposite edges thereof. The blade is connected to each side of the conveyor frame through support members and is further connected near the top of each side of the conveyor frame through tension adjusting means (such as a pair of turnbuckles) which can be used to adjust the position of the scraper by raising or lowering the blade in relation to the belt. Contrary to prior art approaches of placing a scraper against a portion of a conveyor belt trained tautly about a pulley surface, an important feature of the invention is predicated upon placing the scraper slightly behind the discharge pulley where the belt extends in free space so that the belt may ride over the scraper (i.e., be slightly elevated at the points of contact with the scraper) when the scraper blade is appropriately positioned relative to the belt (as by tightening the turnbuckles to raise the blade). This slight elevation in the belt enables the scraper to more efficiently remove foreign material and residue. Obviously, this manner of operation is not possible when the scraper is placed adjacent the circumference of the pulley since in such a configuration the belt cannot be readily deformed in the above-indicated manner.

The preferred forms of the two interior scrapers near the receiving end of the conveyor utilized hard steel, blunt edge scraper blades as described for the exterior discharge end scraper but are otherwise of different design and perform different functions relative to the discharge end scraper. One of the interior scrapers (hereinafter called "receiving end scraper") is adjustably mounted in simultaneous contact with both the receiving end pulley and the belt, at right angles to the belt and parallel to the axis of rotation of the pulley. The steel scraper blade is positioned in contact with the belt, and the scraper further includes a rubber wiper positioned in contact with the pulley. The scraper is firmly attached to the sides of the conveyor frame by an adjustable leveling means (such as a two bolt connection on each side) which holds the scraper firmly against the pulley and belt and insures that the scraper will not work loose from its position. Although quite simple in approach, the utilization of the adjustable leveling means is a key feature in the practice of the present invention and indeed accounts for assured simultaneous scraping of both the belt and pulley surfaces so that no foreign material will slip between the belt and pulley and cause rough operation or jamming of the conveyor mechanism. The receiving end scraper is also designed (correspondingly to the discharge end scraper) to affect all but marginal areas of the belt adjacent the opposite edges thereof, which approach has been found to have a significant bearing upon the operational life of the scraped belt.

The second interior scraper near the receiving end pulley rides on the inside surface of the belt to function as a skimmer in advance of the receiving end scraper and is placed between the receiving end scraper and the discharge end scraper and closer to the former. This scraper (hereinafter called "V scraper") is formed in a V-shape and is oriented with the vertex of its V-shape at the center of the belt and pointing toward the discharge end of the conveyor. This orientation is effective to remove foreign material from the belt by directing such material along either side of the V-shape configuration to the sides of the belt. The V scraper is especially effective in removing wet, sticky material from the belt by virtue of a unique pivoting arrangement which serves to create an equal pressure at each point of contact between the belt and scraper. This arrangement involves pivoting the scraper relative to the conveyor frame at opposite points approximately midway between the apex and base of the triangle formed by its V-shape. Such an arrangement has proved to be superior to straight scrappers, slant scrapers, or even V-shaped scrapers which are pivoted at one end rather than near the midpoint, as indicated above, and serves as an efficient means to remove foreign material from the interior surface of the belt in advance of the final opportunity to scrape that surface afforded by the receiving end scraper.

A brief summary of the practice of the present invention is as follows. After the material is discharged from a given point on the conveyor belt, the outside surface of the belt at that point passes under the discharge pulley and then over the discharge end scraper, where the belt is slightly elevated to ride over the scraper edge and thus to be scraped clean of foreign material and residue. The inside surface of the belt at that point then passes under the V scraper where foreign matter is skimmed from the inside surface by the application of equal pressure across the entire width of the V scraper, and shortly thereafter the same inside surface moves toward the receiving end pulley and passes under the receiving end scraper, where any remnants of residue are removed before the given point of the belt passes around the receiving end pulley. It will also be remembered that the receiving end scraper additionally serves to simultaneously wipe the surface of the receiving end pulley at the same time as the interior surface of the belt is being scraped thereby.

The above scraping techniques when used in the manner described have proved to be superior to previous systems in conjointly removing undesired material from both the inside and outside surfaces of a conveyor belt and results in more efficient and trouble-free operation than has been heretofore possible.

The above-mentioned objects, advantages, and features of the present invention will hereinafter appear, and, for purposes of illustration but not of limitation, an exemplary embodiment is illustrated in the accompanying drawings, in which like reference characters refer to like parts throughout and in which:

FIGURE 1 is a fragmentary top plan view of a preferred form of a scraper assembly designed in accordance with the requirements of the present invention and shown in association with a belt conveyor system of the type shown in the above-cited U.S. Patents Nos. 3,151,732, 3,171,534, and 3,203,538;

FIGURE 2 is a front view, partially in section, of the arrangement shown in FIGURE 1;

FIGURE 3 is an enlarged sectional view of the V scraper, taken along the line 3—3 of FIGURE 1;

FIGURE 4 is a similar view of the receiving end scraper, taken along the line 4—4 of FIGURE 1;

FIGURE 5 is also a similar view of the discharge end scraper, taken along the line 5—5 of FIGURE 1;

FIGURE 6 is an enlarged framentary view of the V scraper, taken along the line 6—6 of FIGURE 1, with the conveyor belt being shown in section;

FIGURE 7 is a similar view of the receiving end scraper, taken along the line 7—7 of FIGURE 1; and FIGURE 8 is also a similar view of the discharge end scraper, taken along the line 8–8 of FIGURE 1.

With reference to these drawings, FIGURES 1 and 2 show the discharge end fragment D and the receiving end fragment R of a frame 9, which forms the main support and frame for a conveyor system in which the scraper means of the present invention are utilized. It will be noted that any suitable frame may be used in place of the illustrated frame 9, including frames utilizing telescopic side members such as is shown in the above-cited U.S. Patent No. 3,203,583.

As shown in FIGURES 1 and 2, electric drive motor 11 is connected through drive shaft 13 to drive gear 14. Any suitable electric motor may be used for motor 11; the size of the motor will vary depending on the length of the conveyor and the type of material to be transported.

Gear 14 is connected to receiving pulley 21 through gear 18 and chain 15. As is well known in the art, the size of gears 14 and 18 and the type of drive used to connect said gears may be varied to meet different speeds and loading requirements of the conveyor.

Receiving pulley 21 is mounted on shaft 19 and is connected to either side of frame 9 through oppositely disposed bearings 17 and 23, respectively.

As shown in FIGURES 1 and 2, conveyor belt 50 (which is preferably formed of rubber) takes the form of a closed loop, resilient member which is partially wrapped around receiving pulley 21. As best shown in FIGURE 2, belt 50 is looped around receiving pulley 21 and discharge pulley 49 to form a loop with oppositely disposed top and bottom sides that extend generally horizontally. In FIGURE 1 the top side of the loop is broken away to more clearly show the scraper assembly and other internal parts of the conveyor. As will be hereinafter described in detail, material to be transported on the conveyor is generally received on the top side of belt 50 in the vicinity of pulley 21, transported along the said top side of belt 50, and eventually discharged from belt 50 as the top side thereof passes around pulley 49 and becomes the corresponding bottom side.

The receiving end scraper 24 is shown in detail in FIGURES 1, 2, 4 and 7. More specifically, wiper 27 and blade 26 are shown connected to opposite sides of generally U-shaped scraper bar 25 by appropriately spaced conventional bolts 33 through 37. The base of U-shaped scraper bar 25 extends across belt 50 between the top and bottom sides thereof in a plane parallel to the axis of pulley 21 and perpendicular to said sides. A first leg of scraper bar 25 extends generally perpendicularly from said base and is connected to an adjacent interior side of conveyor frame 9 by means of bolts 29 and 30, which are received in a longitudinal slot provided in said leg. Similarly, a second leg of scraper bar 25 is connected to an oppositely disposed adjacent interior side of conveyor frame 9 by means of analogously mounted bolts 31 and 32.

It will be noted that receiving end scraper 24 makes contact with both pulley 21 and belt 50. More specifically, at best shown in FIGURE 4, wiper 27 makes contact with the exterior surface of pulley 21 and with the interior surface of belt 50 while a preferably blunt (i.e., rectangular) end of blade 26 makes simultaneous contact with the interior surface of belt 50. Since forces are being applied to scraper bar 25 from two directions (i.e., because both pulley 21 and belt 50 are in contact with receiving end scraper 24), it is important that bar 25 be securely attached to frame 9 since otherwise the proper spatial relationship between pulley 21, belt 50, and scraper 24 may be disturbed such that scraper 24 becomes essentially non-functional. Consequently, it should be noted that bar 25 is attached to frame 9 by two bolts at each side of frame 9. The two bolt attachments secure scraper bar 25 at a given level and prevent any rotation thereof from that level on account of the bi-directional forces acting to displace scraper bar 25. Nonetheless, longitudinal adjustment of bar 25 may be readily effected if desired by appropriate loosening and re-tightening of bolts 29–32. This adjustment feature is of special importance in connection with belt tensioning adjustment arrangements, such as shown in the above-cited U.S. Patent No. 3,203,538.

Other means of securing bar 25 to frame 9 can be utilized to achieve the requisite assurance of non-departure of bar 25 from a given level of desired operation. For example, each end of bar 25 could be retained in brackets securely mounted to frame 9. However, the two bolt adjustment shown herein is preferred because of its simplicity and because initial adjustment of bar 25 is easily accomplished thereby. In any event, regardless of how accomplished, the necessity of preventing undesired rotation of scraper bar 25 during operation has been found to be an essential characteristic of optimized scraping techniques for the interior of a closed loop conveyor belt, in the manner described herein.

In connection with wiper 27, any suitable soft substance which will not mar the surface of pulley 21 may be used to scrape the surface thereof. Optimum results have been achieved with half inch neoprene rubber as the preferred material.

Likewise, in connection with blade 26, the preferred practice of the present invention involves the use of a relatively hard steel (e.g., a blade fabricated of hot rolled carbon steel having a Brinell number in the range of about 275–675). Best results have been achieved when the blade is hardened by conventional heat treatment to raise its Brinell number to the range of about 550 to 625. However, other types of metal with different Brinell numbers may be used to achieve satisfactory results, depending upon the particular exigencies of a given environment of use.

As best shown in FIGURE 7, an important advantage of the present invention is achieved by dimensioning blade 26 such that scraping does not occur across the entire width of belt 50. Preferably, an approximately one inch marginal strip at each side of the belt (for conventional width belt) remains unscraped to preserve the life of the belt, and this is achieved by tapering or curving blade 26 away from belt 50 at the respective extremities thereof. Practical experience with conveyor belts of the type under consideration and with various scraping techniques employed therewith has shown that the critical wear points of a belt are its respective edges (that is, a belt usually first wears out at its edges), and appropriate shaping of scraper 24 to avoid contact with the marginal edges of belt 50 has been found to be a simple but effective approach for maximizing the operational life of such a belt.

Another preferred practice of the present invention is to dimension blade 26 such that the aforementioned blunt scraping end thereof has a width of about 1/16–1/8 inch (e.g., #13 gauge having a width of about 0.09 inch). This approach has been found to yield optimum operational results for the conveyance of concrete in the manners described herein.

As shown in FIGURES 1 and 2, rollers 81 and 83 are connected by shaft 82 and are placed across conveyor frame 9 to form a V-shape. Roller 81 is connected to frame 9 through shaft 79 and bracket 77; similarly, roller 83 is connected to frame 9 through shaft 85 and bracket 87. Rollers 81 and 83 are but one pair of a series of roller pairs which are placed between pulleys 21 and 49. Additional roller pairs are omitted herein for purposes of clarity and ease of illustration. V-shaped rollers such as pair 81, 83 are generally used in conveyor systems when wet or easily spilled material is to be transported. When the top side of the conveyor belt is loaded with the material to be transported, it sags between the roller pairs such as 81, 83 and forms a trough in which the material rides down the conveyor. As is well known in the art, other types of suitable rollers may be used to replace the V-shaped roller pairs such as rollers 81, 83.

The V scraper 38 is shown in detail in FIGURES 1, 2, 3, and 6. More specifically, V scraper 38 comprises scraper blades 40 and 41 which are connected to scraper bar 39 by means of conventional bolts 42, 43 and 44, 45, respectively. Bar 39 is pivoted at two oppositely disposed points on frame 9 by conventional bolts 46, 47, respectively. It will be noted that V scraper 38 forms a general W-shape formed by two foreshortened outer legs and two inner legs arranged in a V shape with its vertex (intersecting base point of the V) pointing toward discharge pulley 49 and its open end line (the head or line of greatest divergence of the V) at a 90° angle to the direction of travel of the conveyor belt. As best shown in FIGURE 2, the pivoting points provided by bolts 46, 47 are connected to the aforeshortened outer legs of scraper 38 and are located between the vertex and baseline of the V-shape formed by the inner legs of the scraper 38 configuration. Pivoting the scraper between its vertex and baseline has been found to achieve the advantage of having an equal pressure distribution across the entire length of V scraper 38 at its points of contact with belt 50. That is, as belt 50 passes underneath V scraper 38, uniform pressure is automatically applied at all points of contact between the scraper and belt since the pivot axis defined by aligned bolts 46, 47 is chosen such that the torque on the discharge end balances and therefore cancels the opposing torque on the receiving end.

Blades 40, 41 attached to V scraper 38 are preferably made of the same material as blade 26 in receiving end scraper 24. However, since V scraper 38 is designed to operate essentially as a mere skimmer and diverter in advance of the relatively close receiving end scraper 24 (which as described above is so positioned as to preclude movement from its predetermined level of operation adjacent the interior surface of belt 50), an important difference between blades 40, 41 and blade 26 is that blades 40, 41 are dimensioned so that the effective lateral width of blades 40, 41 extends across the entire width of belt 50, and accordingly the pivotally mounted V scraper 38 merely rests atop the interior surface of belt 50 without the application of undue wear pressures and is free to pivot or "ride over" any unusually large or strongly adhered foreign obstructions on that surface so that the rigid scaper 24 can function to effect the requisite cleaning action.

The discharge end scraper 48 is shown in detail in FIGURES 1, 2, 5 and 8. Scraper 48 basically comprises scraper bar 51 and discharge skirt 52, brace member 53, and scraper blade 54 are respectively connected by means of conventional bolts (such as bolts 65, 69 shown in FIGURES 5 and 8). Also, FIGURE 1 shows connecting rods 55, 56 extending perpendicularly from opposite sides of scraper bar 51 toward located brackets 57, 58, respectively. Bracket 57 is connected to frame 9 by bolts 61, 62, and similarly bracket 58 is connected to frame 9 by bolts 63, 64.

As shown in FIGURES 1 and 2, skirt 52 is located beneath discharge pulley 49 and functions to direct foreign material removed from belt 50 by scraper 48 to an appropriate discharge position beneath the conveyor.

Moreover, it will be noted that scraper 48 including blade 54 is placed a short distance from discharge pulley 49 toward receiving pulley 21. As best shown in FIGURES 2 and 5, the above-described placement of discharge scraper 48 enables belt 50 to be slightly elevated as it rides over blade 54. This slight elevation in belt 50 enables blade 54 to more effectively clean belt 50 of foreign material and residue, compared to previously known scraping techniques.

Blade 54 is preferably made of the same material as the previously described blade 26 of receiving end scraper 24, and the foregoing remarks made with respect to said blade 26 apply equally to blade 54. Again, it will be noted that appropriate dimensioning of blade 54 precludes contact of blade 54 with the marginal edges of belt 50 in order to prolong the operational life of the belt.

As shown in FIGURES 1, 2 and 8, turnbuckles 59, 60 are connected at their top ends through brackets 97, 95, respectively to opposite sides of conveyor frame 9 and are connected at their bottom ends to rods 55, 56, respectively. As shown in FIGURES 1 and 2, brackets 95 and 97 are connected between their respective top ends by spacing bar 99. Turnbuckles 59, 60 may be adjusted to raise or lower discharge end scraper 48 to correspondingly increase or decrease the pressure between blade 54 and belt 50 and thus the extent of the aforementioned elevation of belt 50 over blade 54. As best shown in the left side of FIGURE 8, scraper bar 51 is connected to conveyor frame 9 through connecting rod 56, turnbuckle 60, and bracket 95. The housing of turnbuckle 60 is retained in a slot (not shown in detail) in bracket 95, and the stem of turnbuckle 60 is provided with a loop through which connecting rod 56 passes. In a well known manner, relative rotational movement between the stem and housing of turnbuckle 60 results in relative axial movement therebetween, and in this manner an adjustment means is provided to raise or lower connecting rod 56 and thus blade 54 of discharge scraper 48, as required. In like manner, the right side of FIGURE 8 shows scraper bar 51 connected to conveyor frame 9 through connecting rod 55, turnbuckle 59, and bracket 97.

FIGURES 1 and 2 also show discharge pulley 49 connected to one side of frame 9 through shaft 89 and bracket 91, and to the other side of frame 9 through shaft 89 and bracket 93. With reference to the extreme left and right hand portions of FIGURE 1, belt 50 is shown partially broken away to indicate its partially looped relationship around receiving pulley 21 and discharge pulley 49. The top portion of the loop formed by belt 50 is thus broken away in FIGURE 1 to more clearly reveal the assembly of discharge scraper 24 and V scraper 38 as described heretofore. The complete loop formed by belt 50 including the top and bottom sides thereof is shown in FIGURE 2.

With reference to FIGURES 1 and 2, brackets 71 and 73 are shown therein connected to opposite sides of frame 9 to guide and position discharge skirt 52 which is suspended from its sandwiched placement between bar 51 and brace member 53 of discharge scraper 48.

The operation of the above-described scraping techniques may be summarized as follows. With reference to FIGURES 1 and 2, when it is desired to transport material along belt 50 from the receiving end to the discharge end of the conveyor belt unit (i.e., from left to right in FIGURES 1 and 2), motor 11 is turned on and is operative through drive chain 15 to turn receiving pulley 21 in a clockwise direction (as shown by the arrow thereon in FIGURE 2). When pulley 21 is driven in a clockwise direction, a given point on belt 50 will traverse the continuously moving top loop of belt 50 and will travel from receiving pully 21 to discharge pulley 49 (i.e., from left to right as shown in FIGURE 2). The material to be transported is placed upon belt 50 near receiving pulley 21 and is accordingly carried along the belt and discharged at discharge pulley 49. The given point of belt 50 then travels around discharge pulley 49 (which also rotates as an idler pulley in a clockwise direction, as shown by the arrow thereon in FIGURE 2) to the bottom loop of belt 50 as shown in FIGURE 2, and subsequently the said given point (which is now on the lowermost outside surface of belt 50) will pass over blade 54 of discharge end scraper 48.

Turnbuckles 59 and 60 (FIGURE 8) should be adjusted to create a slight elevation in belt 50 as it travels over blade 54. About a half inch maximum elevational height in belt 50 relative to its normal horizontal path is usually adequate to achieve optimum scraper efficiency in actual practice (e.g., where conveyor frame 9 extends about twenty-seven to thirty-five feet in length, and belt 50 correspondingly has a half-loop length of about twenty-four to thirty-two feet and a width of about twelve to sixteen inches), but of course any other suitable elevation in belt 50 may be achieved as required by appropriately adjusting turnbuckles 59 and 60.

As the said given point of belt 50 travels over discharge end scraper 48, it travels from the discharge to receiving end (i.e., from right to left as shown in FIGURE 2). The inside surface of belt 50 passes under V scraper 38 where foreign material which may have collected on the inside surface of belt 50 is skimmed and diverted off the said surface by the application of substantially uniform pressure at all points of contact between V scraper 38 and belt 50. As previously indicated and as best shown in FIGURE 1, V scraper 38 is hinged at a midway point, and this novel means of pivoting V scraper 38 not only provides uniform pressure at all points of contact between the V scraper 38 and belt 50, but also allows V scraper 38 enough freedom of movement to avoid malfunctioning or even break down of V scraper 38, belt 50, etc., as when an unusually large rock or other contamination appears on the inside surface of belt 50.

After the said given point of belt 50 has passed through the initial skimming operation of V scraper 38, it passes beneath rigidly positioned blade 26 of receiving end scraper 24. Any residual particles of foreign matter which may not have been removed from the inside surface of belt 50 by V scraper 38 are definitely eliminated by blade 26 of scraper 24, which is maintained at its predetermined level of operation in juxtaposition to the inside surface of belt 50 (notwithstanding the dynamic forces that tend to disrupt this essential interrelationship) by means of the rigidifying effect of the previously described two bolt antipivot attachment of each side of scraper 24 to frame 9. As best shown in FIGURE 4, while the inside surface of belt 50 receives its final scraping from blade 26, the revolving surface of pulley 21 is also being wiped clean by flexible wiper 27 attached to bar 25 of scraper 24. Moreover, wiper 27 also serves to wipe the interior surface of belt 50. After passing beneath wiper 27, the said given point of belt 50 travels around receiving end pulley 21 to the top loop of belt 50, and the described cycle may be continuously repeated by the receipt of additional material.

If receiving end scraper 24 should come out of adjustment (i.e., wiper 27 and blade 26 depart from the described contact with pulley 21 and belt 50), as for example because of the development of slack in belt 50 due to stretching caused by repeated use, scraper 24 can be readily readjusted by loosening bolts 29–32, moving bar 25 into its proper position as shown in FIGURE 4, and then securely tightening bolts 29–32 to frame 9 so as to rigidly hold bar 25 at its readjusted level of operation. In an analogous manner, the relative positions of belt 50 and discharge scraper 48 may be readjusted, as required.

It should be understood that the embodiments described are merely exemplary of the preferred practices of the present invention and that various changes, modifications, and variations may be made in the arrangements, operations, and details of construction of the foregoing disclosure, without departing from the spirit and the scope of the present invention, as defined in the appended claims.

What is claimed is:

1. In a horizontal conveyor having first and second sides and with a belt having an outer surface and an inner surface arranged between a first receiving pulley and a second discharge pulley to form a closed loop having a top side and a bottom side, scraper improvements for cleaning the inner surface of the belt, comprising the combination of:
   receiving scraper blade means positioned in contact with the inner surface of the belt and located on the bottom side of the loop;
   anchoring means for holding the receiving scraper blade means in a predetermined position in relation to the belt;
   adjusting means operative upon the anchoring means for selectively varying said predetermined position of the receiving scraper blade means in relation to the belt;
   leveling means operative upon the anchoring means for rigidly maintaining the receiving scraper blade means in any given predetermined position that has been selectively determined by the adjusting means;
   skimming means positioned in contact with the inner surface of the belt and located on the bottom side of the loop between the receiving scraper blade means and the discharge pulley and relatively closer to the former, said skimming means comprising a rigid skimming member including a convergent vertex portion and a divergent open end portion; and
   pivotable anchoring means that pivotally mount the skimming means along an axis located between the convergent vertex portion and the divergent open end portion thereof,
   whereby the torque due to the weight of the convergent vertex portion substantially equals the torque due to the weight of the divergent open end portion and whereby the inner surface of the belt may be sequentially skimmed and then scraped before any contact of said inner surface with the surface of the receiving pulley.

2. A combination, as claimed in claim 1, and further comprising: wiper means positioned in contact with the surface of the receiving pulley and located between the top and the bottom sides of the belt; and
   means affixing the wiper means to said anchoring means holding the receiving scraper blade means, whereby the inner surface of the belt and the surface of the receiving pulley may be simultaneously cleaned.

3. A combination, as claimed in claim 2, and further comprising discharge scraper blade means positioned in contact with the outer surface of the belt and located on the bottom side of the loop.

4. A combination, as claimed in claim 1, wherein:
   the skimming member is arranged in the general shape of a W and comprises two inner legs arranged in the form of a V having a convergent vertex portion and a divergent open end portion, and two foreshortened outer legs connected between the divergent open end portion and the pivotable anchoring means; and the pivotable anchoring means comprise an attachment device connected between each outer leg of the skimming member and an adjacent side of the horizontal conveyor, whereby an equal pressure distribution is achieved at all points of contact between the skimming member and the inner surface of the belt skimmed thereby.

5. In a horizontal conveyor with a first and second side and a belt having an outer surface and an inner surface arranged between a first receiving pulley and a second discharge pulley to form a closed loop having a top side and a bottom side, improved scraper means for cleaning the inner surface of the belt, comprising the combination of:

skimming means positioned in contact with the inner surface of the belt and located on the bottom side of the loop between the receiving scraper blade means and the discharge pulley and relatively closer to the former, said skimming means comprising a rigid skimming member including a convergent vertex portion and a divergent open end portion; and pivotal anchoring means that pivotally mount the skimming means along an axis located between the convergent vertex portion and the divergent open end portion thereof, so that the torque due to the weight of the convergent vertex portion substantially equals the torque due to the weight of the divergent open end portion, whereby the inner surface of the belt may be skimmed before any contact of said inner surface with the surface of the receiving pulley.

6. A combination, as claimed in claim 5, wherein:

the skimming member is arranged in the general shape of a W and comprises two inner legs arranged in the form of a V having a convergent vertex portion and a divergent open end portion, and two foreshortened outer legs connected between the divergent open end portion and the pivotal anchoring means; and the pivotable anchoring means comprise an attachment device connected between each outer leg of the skimming member and an adjacent side of the horizontal conveyor;

whereby an equal pressure distribution is achieved at all points of contact between the skimming member and the inner surface of the belt skimmed thereby.

7. A combination, as claimed in claim 5, wherein the skimming means comprises a scraper blade means that is fabricated from hot rolled carbon steel having a Brinell number in the range of about 275–675.

8. A combination, as claimed in claim 5, wherein the skimming means comprises a scraper blade that is fabricated from hot rolled carbon steel having a Brinell number in the range of about 550–625.

9. In a horizontal conveyor having first and second sides and with a belt having an outer surface and an inner surface arranged between a first receiving pulley and a second discharge pulley to form a closed loop having a top side and a bottom side, scraper improvements for cleaning the inner surface of the belt, comprising the combination of:

receiving scraper blade means positioned in contact with the inner surface of the belt and located on the bottom side of the loop, the said receiving scraper blade means being fabricated from hot rolled carbon steel having a Brinell number in the range of about 275–675;

anchoring means for holding the receiving scraper blade means in a predetermined position in relation to the belt;

adjusting means operative upon the anchoring means for selectively varying said predetermined position of the receiving scraper blade means in relation to the belt; and leveling means operative upon the anchoring means for rigidly maintaining the receiving scraper blade means in any given predetermined position that has been selectively determined by the adjusting means;

whereby the inner surfaces of the belt may be cleaned prior to contact thereof with the surface of the receiving pulley.

10. A combination, as claimed in claim 9, wherein the receiving scraper blade means is fabricated from hot rolled carbon steel having a Brinell number in the range of about 550–625.

11. In a horizontal conveyor having first and second sides and with a belt having an outer surface and an inner surface arranged between a first receiving pulley and a second discharge pulley to form a closed loop having a top side and a bottom side, scraper improvements for cleaning the inner surface of the belt, comprising the combination of:

receiving scraper blade means positioned in contact with the inner surface of the belt and located on the bottom side of the loop;

anchoring means for holding the receiving scraper blade means in a predetermined position in relation to the belt;

the said anchoring means comprising a generally U-shaped frame member adapted to be mounted between opposite sides of the horizontal conveyor;

adjusting means operative upon the anchoring means for selectively varying said predetermined position of the receiving scraper blade means in relation to the belt;

the said adjusting means comprising a pair of longitudinal slots disposed on opposite sides of the generally U-shaped member; and leveling means operative upon the anchoring means for rigidly maintaining the receiving scraper blade means in any given predetermined position that has been selectively determined by the adjusting means;

the said leveling means comprising a pair of bolts for each longitudinal slot and adapted to pass therethrough in order to interconnect the generally U-shaped member to opposite sides of the horizontal conveyor and to preclude any movement thereof from any given predetermined position that has been selectively determined by the relative positions of each longitudinal slot and its associated pair of bolts;

whereby the inner surface of the belt may be cleaned prior to contact thereof with the surface of the receiving pulley.

References Cited

UNITED STATES PATENTS

| 689,881 | 12/1901 | Hoy | 198—230 |
| 936,297 | 10/1909 | Bowen | 198—230 X |
| 2,859,864 | 11/1958 | Ibaugh | 198—230 X |
| 3,139,975 | 7/1964 | Schaefer | 198—230 |

FOREIGN PATENTS

| 299,329 | 2/1929 | Great Britain. |
| 850,690 | 10/1960 | Great Britain. |

EDWARD A. SROKA, *Primary Examiner.*